Figure 1:
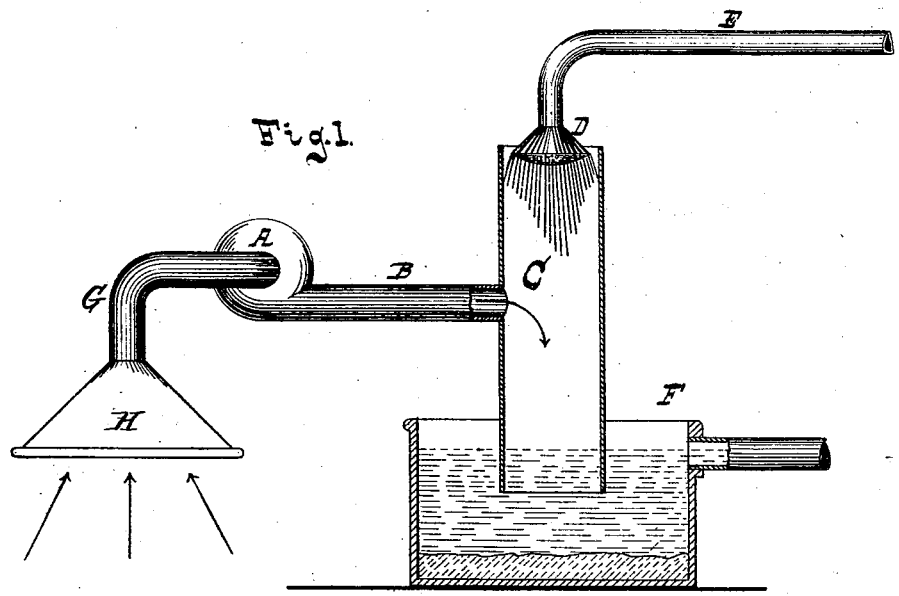

J. P. CONKLING.
DUST-TRAPS FOR ORE-SEPARATORS.

No. 185,299. Patented Dec. 12, 1876.

Witnesses.
Otto Hufeland
Robt. E. Miller

Inventor
John P. Conkling
Van Santvoord & Hauff
Attorneys

UNITED STATES PATENT OFFICE.

JOHN P. CONKLING, OF SARATOGA SPRINGS, NEW YORK, ASSIGNOR TO NEW YORK ORE SEPARATOR COMPANY.

IMPROVEMENT IN DUST-TRAPS FOR ORE-SEPARATORS.

Specification forming part of Letters Patent No. 185,299, dated December 12, 1876; application filed March 22, 1876.

To all whom it may concern:

Be it known that I, JOHN P. CONKLING, of Saratoga Springs, in the county of Saratoga and State of New York, have invented a new and Improved Apparatus for Collecting Dust from Ore-Separators and other machines, which invention is fully set forth in the following specification, reference being had to the accompanying drawing.

This invention consists in the combination of a flaring hood with a suction-pipe, a fan-blower, a dust-escape pipe, a trunk which dips into a tank containing water or other liquid, and spout for injecting a spray or jets of water into said trunk, so that, by adjusting the flaring hood over an ore-separator or other machine, the dust which rises from such machine is drawn in by the action of the fan-blower, and expelled through the escape-pipe into the trunk, where it is precipitated by the spray or jets of water and caused to collect in the water-tank, while the pure air escapes into the open atmosphere.

In the drawing, Figure 1 represents a sectional side view of my apparatus.

Similar letters of reference indicate corresponding parts in both figures.

In the drawing, the letter A designates a fan-blower, the suction-spout of which connects, by a pipe, G, with a flaring hood, H, while the discharge-spout of the same communicates with the dust-escape pipe B, that leads into a trunk, C. This trunk is open at both ends, and its lower end dips into water or other liquid contained in a tank, F.

With the trunk C is combined a spout or "rose-head," D, which connects with a water or steam supply pipe, E, and extends into the trunk, as shown.

When the flaring head H is properly adjusted over the machine from which the dust to be collected rises, and when the fan-blower is started, all the dust rising from the machine is drawn in through the hood and suction-pipe, and expelled through the escape-pipe B into the trunk C, and, as it meets the spray or jets of water or steam issuing from the spout D, said dust is precipitated into the tank F, and the pure air escapes into the open atmosphere.

It will be seen that in my apparatus the dust which is thrown down by the spray always meets a clean surface of liquid, since the dust which has been driven down into this liquid immediately sinks to the bottom of the tank. But where no such tank is used the dust when driven down will not be able to get out of the way. The surface which the dust strikes will soon be covered with dust, and a large quantity of ore will escape with the air through the top of the trunk.

I am aware that suction-blowers have been used in connection with a pipe and trunk, in which the dust is precipitated by a jet of steam or water. This I do not claim; but What I do claim, and desire to secure by Letters Patent, is—

In a dust-trap for ore-separators, the combination of a flaring hood, H, suction-pipe G, fan-blower A, dust escape-pipe B, trunk C, tank F, and spout or rose-head D, the lower end of the trunk being submerged in the liquid contained in the tank, substantially as and for the purpose shown and described.

In testimony that I claim the foregoing I have hereunto set my hand and seal this 10th day of March, 1876.

JOHN P. CONKLING. [L. S.]

Witnesses:
 W. HAUFF,
 E. F. KASTENHUBER.